US007660697B2

(12) United States Patent
Hamazoe

(10) Patent No.: US 7,660,697 B2
(45) Date of Patent: Feb. 9, 2010

(54) APPARATUS AND METHOD FOR CALCULATING SIZE TOLERANCE, AND COMPUTER-READABLE RECORDING MEDIUM IN WHICH PROGRAM FOR CALCULATING SIZE TOLERANCE IS STORED

(75) Inventor: Kazuhiko Hamazoe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 48 days.

(21) Appl. No.: 12/024,194

(22) Filed: Feb. 1, 2008

(65) Prior Publication Data
US 2008/0162075 A1 Jul. 3, 2008

Related U.S. Application Data

(63) Continuation of application No. PCT/JP2005/014829, filed on Aug. 12, 2005.

(51) Int. Cl.
*G01B 7/00* (2006.01)
*G01B 5/004* (2006.01)

(52) U.S. Cl. .................... 702/155; 33/503
(58) Field of Classification Search ......... 702/155–158, 702/127, 128, 150–153, 167, 168, 170, 179, 702/182, 183; 700/97, 103, 98, 108, 109, 700/118; 703/1; 33/503, 1 M, 1 N, 1 S, 33/504, 700, 710
See application file for complete search history.

(56) References Cited

U.S. PATENT DOCUMENTS 5,323,333 A * 6/1994 Johnson ..................... 703/1

5,586,052 A * 12/1996 Iannuzzi et al. ............. 703/1
5,691,909 A * 11/1997 Frey et al. ................ 700/159
5,949,693 A * 9/1999 Tandler ...................... 703/1

(Continued)

FOREIGN PATENT DOCUMENTS

| JP | 2820170 | 8/1998 |
|---|---|---|
| JP | 2002-82995 | 3/2002 |
| JP | 2003-6241 | 1/2003 |

OTHER PUBLICATIONS

Sato, A., CAE Introduction Course 3: First-Time Three-Dimensional Tolerance Analysis, Oct. 2000, Kikai Sekkei, vol. 44, No. 16, pp. 59-66.*

(Continued)

*Primary Examiner*—Michael P. Nghiem
*Assistant Examiner*—Toan M Le
(74) *Attorney, Agent, or Firm*—Staas & Halsey LLP

(57) ABSTRACT

The present invention aims at surely and efficiently calculating size tolerances of a plurality of parts constituting a structure with the configuration that includes a tentative size tolerance setting section setting tentative size tolerances of the plurality of parts based on design data of the structure and part information of the plurality of parts; a primary analyzing section calculating a quality of the structure and sensitivities of the plurality of parts based on the tentative size tolerances set by the tentative size tolerance setting section; a judging section judging whether or not the quality satisfies a desired quality which the structure demands; and a secondary analyzing section calculating, if the judging section judges that the quality does not satisfy the desired quality, the size tolerances of the plurality of parts using the sensitivities such that the structure satisfies the desired quality.

17 Claims, 15 Drawing Sheets

U.S. PATENT DOCUMENTS

| | | | |
|---|---|---|---|
| 5,956,251 A * | 9/1999 | Atkinson et al. | 700/109 |
| 6,400,998 B1 * | 6/2002 | Yamazaki et al. | 700/86 |
| 6,507,806 B1 * | 1/2003 | Tandler | 703/1 |
| 6,611,786 B1 * | 8/2003 | Zhang et al. | 702/156 |
| 6,826,510 B2 * | 11/2004 | Gong et al. | 702/155 |
| 6,879,933 B2 * | 4/2005 | Steffey et al. | 702/155 |
| 6,963,824 B1 * | 11/2005 | Davidson et al. | 703/2 |
| 7,212,883 B2 * | 5/2007 | Hollingshead et al. | 700/182 |
| 7,248,992 B2 * | 7/2007 | Wilson | 702/155 |
| 7,398,179 B2 * | 7/2008 | Agapiou et al. | 702/155 |
| 7,400,992 B2 * | 7/2008 | Doytchinov | 702/95 |

OTHER PUBLICATIONS

Sato, A., Hajimete no 3 Jigen Kosa Kaiseki, Oct. 20, 2000, Kikai Sekkei, The Nikkan Kogyo Shinbun, Ltd, vol. 44, No. 6 (2000 Nen 10 Gatsu Special Extra Issue, CAD Koryaku Magazine), pp. 59-66.*

A. Sato, "The First-Time Three Dimensional Torelance Analysis, Machine Design", The Nikkan Kogyo Shimbun, Ltd., vol. 44, No. 16, (Oct. 2000 Special Edition Issue, CAD Conquering Magazine), pp. 59-66, Oct. 20, 2000.

* cited by examiner

FIG. 2

| ITEMS \ SIZE CLASSIFICATION | 0.5~30 | ~120 | ~315 | ~1000 | ~2000 |
|---|---|---|---|---|---|
| CENTER DISTANCE (METAL) | ±0.1 | ±0.15 | ±0.2 | ±0.3 | ±0.5 |
| CENTER DISTANCE (RESIN) NORMAL SIZE (METAL) | ±0.15 | ±0.25 | ±0.4 | ±0.5 | ±0.7 |
| NORMAL SIZE (RESIN) BEND SIZE | ±0.2 | ±0.3 | ±0.5 | ±0.8 | ±1.2 |

3a (ALL DIMENSIONS IN mm)

FIG. 4

PRODUCTION METHOD: INJECTION MOLDING

| SIZE CLASSIFI-CATION / QUALITY Q | 0.5~30 | ~120 | ~315 | ~1000 | ~2000 |
|---|---|---|---|---|---|
| $3\sigma \leq Q < 4\sigma$ | ±0.05 | ±0.08 | ±0.1 | ±0.15 | ±0.25 |
| $4\sigma \leq Q < 5\sigma$ | ±0.08 | ±0.12 | ±0.2 | ±0.25 | ±0.35 |
| $5\sigma \leq Q < 6\sigma$ | ±0.1 | ±0.15 | ±0.25 | ±0.4 | ±0.6 |

(ALL DIMENSIONS IN mm)

| ITEMS \ SIZE CLASSIFICATION | 0.5~30 | ~120 | ~315 | ~1000 | ~2000 |
|---|---|---|---|---|---|
| CENTER DISTANCE (METAL) | ±0.05 | ±0.08 | ±0.1 | ±0.15 | ±0.25 |
| CENTER DISTANCE (RESIN) NORMAL SIZE (METAL) | ±0.08 | ±0.12 | ±0.2 | ±0.25 | ±0.35 |
| NORMAL SIZE (RESIN) BEND SIZE | ±0.1 | ±0.15 | ±0.25 | ±0.4 | ±0.6 |

(ALL DIMENSIONS IN mm)

·STATISTICAL DISTRIBUTION
(σ VALUE)

·SENSITIVITY

| Name | Sensitivity | |
|---|---|---|
| PISTON d11 | | -1 mm/mm |
| CHAMBER:Pin Hole to B Offset | 1 mm/mm | |
| CHAMBER:Top Inner face to B Offset | | -1 mm/mm |
| STOP PIN d0 | | -0.5 mm/mm |

·CONTRIBUTION RATE

| Name | Contributions |
|---|---|
| CHAMBER:Pin Hole to B Offset | 30.77% |
| PISTON d11 | 30.77% |
| CHAMBER:Top Inner face to B Offset | 30.77% |
| STOP PIN d0 | 7.69% |

·STATISTICAL DISTRIBUTION
(σ VALUE)

·SENSITIVITY

| Name | Sensitivity | |
|---|---|---|
| PISTON d11 | | -1 mm/mm |
| CHAMBER:Pin Hole to B Offset | 1 mm/mm | |
| CHAMBER:Top Inner face to B Offset | | -1 mm/mm |
| STOP_PIN d0 | | -0.5 mm/mm |

·CONTRIBUTION RATE

| Name | Contributions |
|---|---|
| PISTON d11 | 25.00% |
| CHAMBER:Top Inner face to B Offset | 25.00% |
| CHAMBER:Pin Hole to B Offset | 25.00% |
| STOP_PIN d0 | 25.00% |

US 7,660,697 B2

APPARATUS AND METHOD FOR CALCULATING SIZE TOLERANCE, AND COMPUTER-READABLE RECORDING MEDIUM IN WHICH PROGRAM FOR CALCULATING SIZE TOLERANCE IS STORED

This application is a continuation application, filed under 35 USC 111(a), of International Application PCT/JP2005/014829, filed Aug. 12, 2005.

TECHNICAL FIELD

The present invention relates to a technology that automatically calculates size tolerances of the sizes of individual parts by using design data (e.g., three-dimensional CAD (Computer Aided Design) data or two-dimensional shape data) used for mechanical design and production of a structure consisting of a number of parts.

BACKGROUND OF THE INVENTION

First of all, description will now be made in relation to a sensitivity and a contribution rate that are to appear in the following.

A sensitivity of each of the parts constituting a structure (an assembly) is determined by the formation of the structure, irrespective of the size tolerances of each part, and is a degree of influence of the part on the size (the design specification value) of a predetermined measurement object portion (e.g., a portion which demands a predetermined quality when the object is to be assembled) of the structure.

More specifically, a sensitivity is a variation rate in the size of a measurement object portion relative to a variation in size of each part.

Accordingly, a part with a higher sensitivity is more important to the quality of the design specification value (in other words, the quality of the structure).

As shown in FIG. 13(a), in structure C formed by parts A and B, the variation in the size of measurement object portion (gap) G results in elongation of 1 mm if the size of part A is elongated by 1 mm in the direction of arrow a. Accordingly, the sensitivity of part A is "1".

Further, as shown in FIG. 13(c), since part B is inclined at 45 degrees to measurement object portion G, elongation of the size of part B by 1 mm in the direction of arrow B results in variation g' in the size of the measurement object portion calculated to be "0.707" by following equation (1)

$$g' = \cos 45° \times 1 \quad (1)$$

The sensitivity of part B is consequently "0.707".

Next, a contribution rate is detailed. A contribution rate of each of the parts is a ratio of a size tolerance of the part to the total sum (the deviation) of size tolerances of the parts that form a measurement object portion (a design specification value). For this reason, a part with a higher contribution rate has a size tolerance larger than those of the remaining parts.

Specifically, if structure D consists of parts D1 and D2 as shown in FIGS. 14(a)-14(c), the contribution rates of parts D1 and D2 are as follows.

As shown in FIG. 14(a), if part D1 has size deviation of "1.0" because the size tolerance of part D1 is "±0.5" and part D2 has size deviation of "2.0" because the size tolerance of part D2 is "±1.0", the size deviation (i.e., the total sum of the size tolerances of parts D1 and D2) at measurement object portion G' is "3.0" as shown in FIG. 14(c) because sensitivities of part D1 and D2 are both "1".

As a result, the contribution of part D1 is "33%" and that of part D2 is "66%".

Conventionally, in designing a structure formed by a number of parts, the designer calculates size tolerances (design specification value) of a portion (a measurement object portion) that requires a predetermined quality in assembly of the structure by manual calculation of the root sum square based on size tolerances of the parts or by estimation based on experience.

However, both methods fail to consider the three-dimensional shape, and if a structure has a complex shape or consists of parts assembled densely, the calculation and inputting (of the sizes and the like) for the calculation tend to be complex and to cause errors.

If a calculation error or input error has occurred, assembly of a structure cannot satisfy the design specification value and results in, at worst, return to the design stage because the structure cannot be assembled.

To avoid this, there recently have been provided tolerance analysis systems utilizing, for example, three-dimensional CAD data (see below Patent References 1-3, for example).

In a conventional tolerance analysis system, tolerance analysis (that is, decision of size tolerances) is performed through the procedure shown in flow diagram FIG. 15 (steps S100-S108).

Specifically, in a conventional tolerance analysis system, design data (shape data, here three-dimensional CAD shape data) of a structure formed by a number of parts is obtained from a design unit using a CAD system or the like (step S100).

With reference to the obtained design data, the designer (the operator of the tolerance analysis system) sets the design specification value of a measurement object portion of the structure (step S101) and inputs size tolerances of each of the parts (step S102) via an interface such as a mouse and/or keyboard.

Further, the designer sets production process data (e.g., a production method and/or the accuracy) for each part according to the material and the production process of the structure (assembly process of part) (step S103).

The arithmetic unit (e.g., the CPU: Central Processing Unit) of the tolerance analysis system starts the tolerance analysis (step S104) and as a result automatically calculates the quality (a value; deviation) to the design specification value, and the sensitivity and the contribution rate of each part (step S105).

In succession, the designer judges whether or not the quality calculated as the result of the tolerance analysis reaches a desired quality (step S106).

Here, if the designer judges that the calculated quality reaches the desired quality (Yes route in step S106), the arithmetic unit outputs the size tolerances, which have been input by the designer in step S102, to complete the tolerance analysis (step S107). Finally, the procedure terminates.

On the other hand, if the designer judges that the calculated quality does not reach the desired quality (No route in step S106), the designer re-examines the size tolerances of each part (step S108) by considering the balance of the entire structure with reference to the sensitivities and the contribution rates of the parts calculated by the arithmetic unit in step S105. On the basis of the result of reexamination, the renewed size tolerances of the parts are input again (step S102).

Namely, until the designer judges that the calculated quality reaches the desired quality (Yes route in step S106), the processes of above steps S108 and S102-S105 are repeated.

A conventional tolerance analysis system calculates size tolerances of the parts which satisfy the desired quality in the manner above described.

Patent Reference 1: Japanese Patent No. 2820170
Patent Reference 2: Japanese Patent Application Laid-Open No. 2002-82995
Patent Reference 3: Japanese Patent Application Laid-Open No. 2003-6241

DISCLOSURE OF THE INVENTION

Problems to be Solved by Invention

Even in use of such a conventional tolerance analysis system, it is not easy to set optimum tolerance of each part to satisfy the desired quality for the following reasons (1) to (4).

(1) A designer has to directly input tolerances of each part (see step S102 in FIG. 15), and such complex inputting is likely to cause input errors if the object is more complex in configuration.

(2) The designer has to set (determine) a production process of each part, considering the material and the production procedure of the object (see step S103 in FIG. 15), and such a complex input process may easily cause input errors.

(3) If the desired quality cannot be obtained as a result of the tolerance analysis (see No route in step S106 in FIG. 15), the designer has to reexamine the size tolerances of the parts (see step S108 in FIG. 15) with reference to sensitivities and contribution rates and there is a high possibility that a number of reexaminations will be required. Further, the reexamination largely depends on experience and guesswork of the operator, and it is therefore difficult to obtain a result satisfying the desired quality unless the designer is skilled. In other words, such a conventional tolerance analysis system is effective in verification of size tolerances set in advance (i.e., the size tolerances initially input), and is therefore highly valued as a verification tool of size tolerances. However, the conventional system does not greatly reduce the number of processes required to calculate size tolerances that satisfy the desired quality.

(4) A real part has a restriction on process conditions or the like due to factors, such as the shape and the material of the part and the restriction limits the constraint on size tolerances, For this reason, setting a size tolerance with excessive accuracy causes a rise in the production cost of the part. To avoid this, a limitation on the tolerances is preferably set for the parts on the basis of the production condition or the like of the parts, but the conventional tolerance analysis system has no means to realize the restriction setting.

With the foregoing problems in view, the object of the present invention is to surely and efficiently calculate size tolerances of a number of parts constituting the object which tolerances satisfy the desired quality.

An additional object of the present invention is to calculate size tolerances with consideration of restrictions and conditions set on size tolerances of the parts.

Means to Solve the Problems

To attain the above objects, there is provided an apparatus calculating size tolerances of a plurality of parts constituting a structure comprising: a tentative size tolerance setting section setting tentative size tolerances of the plurality of parts based on design data of the structure and part information of the plurality of parts; a primary analyzing section calculating a quality of the structure and sensitivities of the plurality of parts based on the tentative size tolerances set by the tentative size tolerance setting section; a judging section judging whether or not the quality calculated by the primary analyzing section satisfies a desired quality which the structure demands; and a secondary analyzing section calculating, if the judging section judges that the quality calculated by the primary analyzing section does not satisfy the desired quality, the size tolerances of the plurality of parts using the sensitivities calculated by the primary analyzing section such that the structure satisfies the desired quality.

As a preferable feature, if the judging section judges is that the quality calculated by primary analyzing section satisfies the desired quality, the primary analyzing section may output the tentative size tolerances set by the size tolerance setting section as the size tolerances.

As another preferable feature, the apparatus may further comprise an obtaining section obtaining the design data of the structure and the part information.

As an additional preferable feature, the tentative size tolerance setting section may set the tentative size tolerances based on a table showing tentative size tolerances associated with sizes of the plurality of parts which sizes are included in the design data and the part information.

As a further preferable feature, the apparatus may further comprise a contribution rate setting section setting contribution rates of the plurality of parts, and the secondary analyzing section may calculate the size tolerances based on the contribution rates calculated by the contribution rate setting section.

As still further preferable feature, the apparatus may further comprise a restriction setting section for setting restrictions on the size tolerances of one or more of the plurality of parts, and the secondary analyzing section may set the size tolerances of the one or more parts for which the restriction setting section may set the restrictions on the size tolerances such that the restrictions are satisfied.

As a still further preferable feature, the apparatus may further comprise a limit value setting section for setting limit values on the size tolerances of one or more of the plurality of parts, and the secondary analyzing section may calculate the size tolerances of the one or more parts within the limit values set by the limit value setting section. Tn addition, the limit value setting section may set the limit values based on a table showing limit values associated with sizes of the plurality of parts which sizes are included in the design data and the part information.

As a still further preferable feature, the apparatus may further comprise a production method selecting section selecting a production method in which each of the plurality of parts is to be produced to make the structure satisfy the desired quality. In this case, if there are two or more of the production methods for each the part making the structure satisfy the desired quality is to be produced, the production method selecting section may preferably select one that costs the least among the two or more production methods.

To attain the above features, there is provided a method for calculating size tolerances of a plurality of parts constituting a structure comprising the steps of: setting tentative size tolerances of the plurality of parts based on design data of the structure and part information of the plurality of parts; calculating a quality of the structure and sensitivities of the plurality of parts based on the tentative size tolerances set in the step of setting the tentative size tolerances; judging whether or not the quality calculated in the step of calculating satisfies a desired quality which the structure demands; and calculating, if the quality calculated in the step of calculating is judged not to satisfy the desired quality in the step of judging, the size tolerances of the plurality of parts using the sensitivities calculated in the step of calculation such that the structure satisfies the desired quality.

To accomplish the above objects, there is provided a recording medium in which a program for calculating size tolerances of a plurality of parts constituting a structure is recorded, wherein the program instructs a computer to function as: a tentative size tolerance setting section setting tentative size tolerances of the plurality of parts based on design data of the structure and part information of the plurality of parts; a primary analyzing section calculating a quality of the structure and sensitivities of the plurality of parts based on the tentative size tolerances set by the tentative size tolerance setting section; a judging section judging whether or not the quality calculated by the primary analyzing section satisfies a desired quality which the structure demands; and a secondary analyzing section for calculating, if the judging section judges that the quality calculated by the primary analyzing section does not satisfy the desired quality, the size tolerances of the plurality of parts using the sensitivities calculated by the primary analyzing section such that the structure satisfies the desired quality.

Effect of Invention

As described above, since the tentative size tolerance setting section sets size tolerances of sizes of the parts (the step of setting tentative size tolerances), it is possible to eliminate the requirement for inputting by the designer and consequently the occurrence of input errors.

In addition, the secondary analyzing section calculates the size tolerances of the sizes of the parts, using the sensitivities of the parts which have been calculated in the primary analyzing section such that the object comes to be the desired quality (the step of secondary analyzing), which makes it possible to surely and efficiently figure size tolerances which satisfy the standard quality.

BRIEF DESCRIPTION OF THE DRAWINGS

[FIG. 2] A table of a tentative size tolerance setting section included in the apparatus for calculating size tolerances according to this embodiment;

[FIG. 4] A table of a primary production method selecting section and a secondary production method selecting section included in the apparatus for calculating size tolerances according to this embodiment;

[FIG. 7] A table of a limit value setting section included in the apparatus for calculating size tolerances according to this embodiment;

REFERENCE OF SYMBOLS

Figure 1:
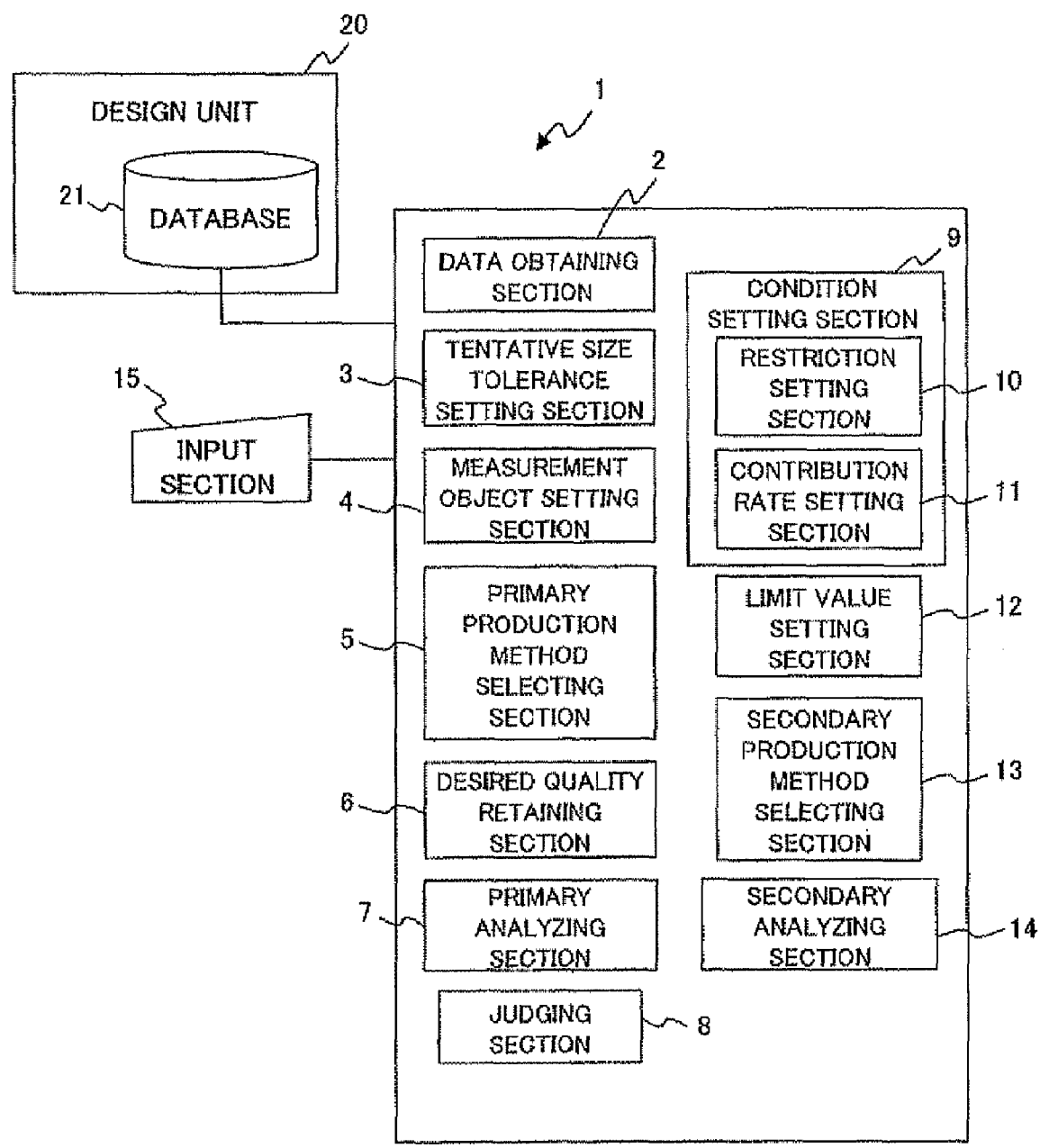
[FIG. 1] A block diagram schematically showing the configuration of an apparatus for calculating size tolerances according to an embodiment of the present invention.

1 apparatus for calculating size tolerances
2 data obtaining section (obtaining section)
3 tentative size tolerance setting section
4 measurement object setting section
5 primary production method selecting section
6 desired quality retaining section
7 primary analyzing section
8 judging section
9 condition setting section
10 restriction setting section
11 contribution rate setting section
12 limit value setting section
13 secondary production method selecting section
14 secondary analyzing section
15 inputting section
20 design unit
21 database

BEST MODE FOR CARRYING OUT THE INVENTION

Hereinafter, an embodiment of the present invention will now be described with reference to the accompanying drawings.

(1) Embodiment

First of all, an apparatus for calculating size tolerances according to this embodiment will be described with reference to block diagram FIG. 1 showing the configuration thereof.

As shown in FIG. 1, apparatus 1 for calculating size tolerance of this embodiment includes data obtaining section (obtaining section) 2, tentative size tolerance setting section 3, measurement object setting section 4, primary production method selecting section 5, desired quality retaining section 6, primary analyzing section 7, judging section 8, condition setting section 9, limit value setting section 12, secondary production method selecting section 13, secondary analyzing section 14, and inputting section 15.

As further shown in FIG. 1, apparatus 1 for calculating size tolerance is connected to design unit 20, particularly to database 21.

Design unit 20 designs a structure consisting of a number of parts with the aid of, for example, a CAD system. Database 21 retains design data (here, three-dimensional CAD shape data) including the shape and the size of a structure designed by use of design unit 20 and part information (attribution information exemplified by a material and a production method of each of the parts) associated with the design data.

Data obtaining section 2 obtains design data of a structure and part information of the parts constituting the structure from database 21. The data and the information obtained is stored in a memory or the like (not shown) included in apparatus 1 for calculating size tolerance.

In addition, if the formats of such design data and part information are not supported by apparatus 1 for calculating size tolerance, data obtaining section 2 converts the formats into other formats that can be dealt with in apparatus 1 for calculating size tolerance.

Tentative size tolerance setting section 3 sets tentative size tolerances (normal size tolerances) of the parts on the basis of the design data and the part information obtained by data obtaining section 2, and specifically tentative size tolerances for each of the parts constituting the object on the basis of the table (see FIG. 2) showing tentative size tolerances corresponding to the size of the part which size is included in the design data and of the part information.

Tentative size tolerance setting section 3 includes, for example, table 3a showing tentative size tolerances associated with sizes, shapes and materials of parts as shown in FIG. 2, and sets tentative size tolerances on the basis of table 3a.

Figure 3A:
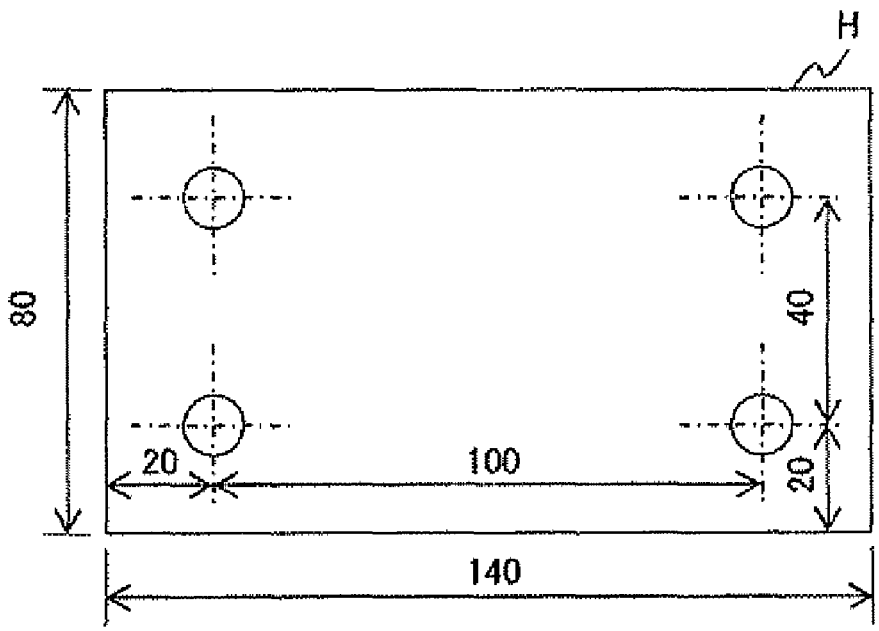
[FIG. 3] Diagrams showing setting of size tolerances by the tentative size tolerance setting section in the apparatus for calculating size tolerances according to this embodiment, (a) showing parts tentative size tolerances of which have not been set, and (b) showing the parts tentative size tolerances of which have been set.
Figure 3B:
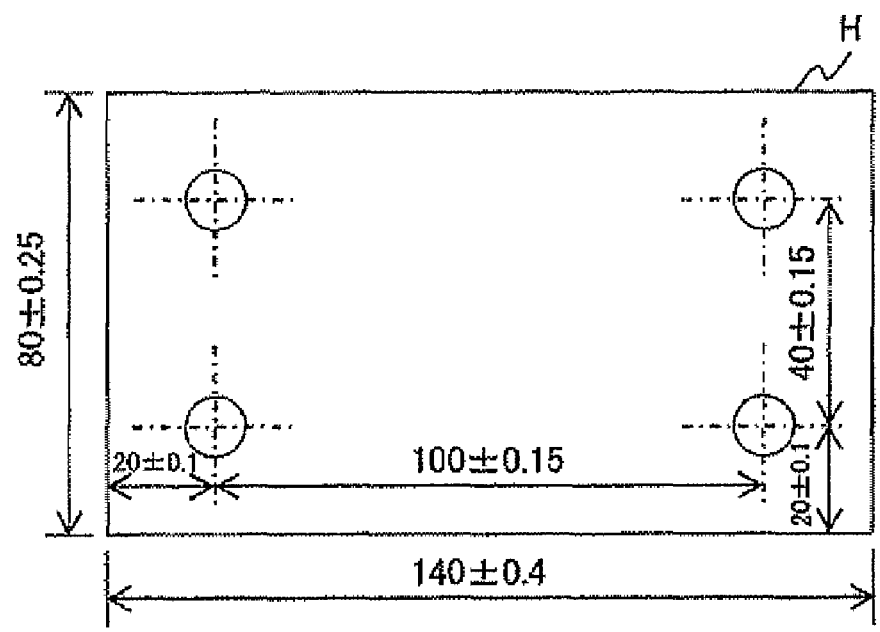

Specifically, assuming that part H, one of the parts obtained by data obtaining section 2, has the shape and the size shown in FIG. 3(a) and is made of metal, tentative size tolerance setting section 3 sets size tolerances to the sizes of part H on the basis of table 3a as shown in FIG. 3(b).

In this example, the tentative size tolerances of both of two center distances "40" and "100" between two holes of part H are set to be "±0.15", and those of the outside sizes (normal sizes) "80" and "140" are set to be "±0.25" and "±0.4", respectively.

If the design data obtained by data obtaining section 2 includes size tolerances, tentative size tolerance setting section 3 may use the size tolerances to set those of the part and may set other tentative size tolerances on the basis of the table. In either case, tentative size tolerance setting section 3 automatically sets a size tolerance (a tentative size tolerance, here) of each dimension of each part without requiring input from the designer.

Measurement object setting section 4 sets a measurement object portion (i.e., a portion requiring a desired quality) that determines the quality of the structure, and further sets a design specification value (a size tolerance, a standard value) for each measurement object portion which has been set.

The setting by measurement object setting section 4 may be automatically performed on the basis of the sizes, the shape and movability and on the basis of design data and part information obtained by data obtaining section 2, or may be performed on the basis of instructions of the designer (the operator of apparatus 1 for calculating size tolerance) input via inputting section 15.

Here, inputting section 15 includes a mouse, a keyboard and others to interface with the designer.

Primary production method selecting section 5 selects a production method of each of the parts constituting the structure and production process data showing the production accuracy of the selected method. For example, production process data is selected on the basis of table 5a (in this example, table concerning the production method of injection molding) shown in FIG. 4.

In other words, primary production method selecting section 5 includes table 5a, one for each of production methods (e.g., injection molding, machining, molding, and sheet-plate working), showing size tolerances associated with size classifications and qualities Q. Primary production method selecting section 5 selects production process data of each part on the basis of table 5a and information about the shape of the part which information is included in design data.

Table 5a shown in FIG. 4 is only an example, and primary production method selecting section 5 may alternatively use a table in which size tolerances are associated with attribution information such as a material and other factors of each part in addition to size classifications and qualities Q.

In selection of production process data on the basis of tables, one for each production method by primary production method selecting section 5, a number of pieces of production process data concerning a number of production methods may be selected. In such a case, primary production method selecting section 5 selects a piece of production process data concerning the production method that costs the least (the cheapest in cost) from a number of production methods selected.

Desired quality retaining section 6 retains the quality which an object structure demands, and specifically retains a desired quality (a quality that a measurement object portion demands) of the structure which quality is input by the designer via inputting section 15.

Primary analyzing section 7 carries out a primary analysis in which the quality ($\sigma$ value; the deviation) is calculated in the system momentum method or in the Monte Carlo method on the basis of tentative size tolerances set by tentative size tolerance setting section 3 and in which the sensitivity and the contribution rate are calculated.

In other words, primary analyzing section 7 calculates the quality of the design specification value of the measurement object portion set by measurement object setting section 4 on the basis of the tentative size tolerances, and regards the calculated quality as the quality of the structure.

Figure 5A:
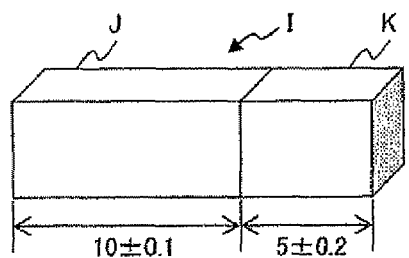
[FIG. 5] Diagrams showing tolerance analysis performed by a primary analyzing section included in the apparatus for calculating size tolerances according to this embodiment, (a) showing a structure to be analyzed, (b) and (c) showing normal distribution curves of a size tolerance of each part constituting the structure, (d) showing a normal distribution curve formed by merging the normal distribution curves of (b) and (c), and (e) explaining standard value of the structure.
Figure 5B:
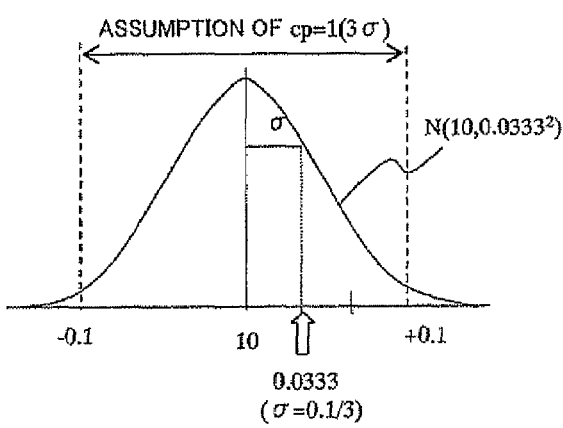
Figure 5C:
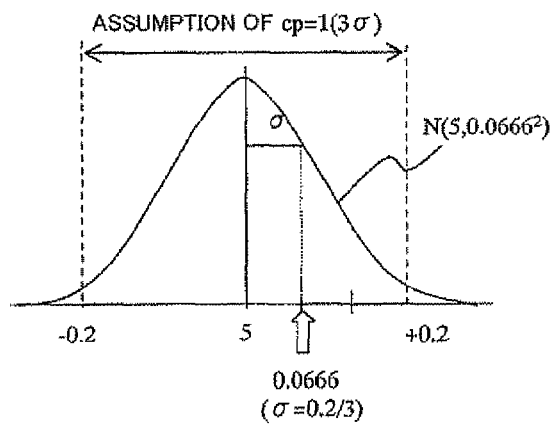

In detail, assuming that, in structure I consisting of parts J and K, size $\mu 1$ of part J has the dimension and a tentative size tolerance of "10" and "±0.1", respectively and size $\mu 2$ of part K has the dimension and a tentative size tolerance of "5" and "±0.2", respectively, as shown in FIG. 5(a), primary analyzing section 7 indicates the tentative size tolerances of parts J and K in normal distributions as shown in FIGS. 5(b) and 5(c), respectively.

As shown in FIG. 5(b), on the assumption that the tentative size tolerance "±0.1" of part J is expressed by a normal distribution (curve) and that the resultant width of the distribution is 3$\sigma$, the $\sigma$ value ($\sigma 1$) of part J is calculated as shown by the following equation (2). Consequently, the normal distribution of part J is expressed by "N(10, 0.0333$^2$)".

$$\sigma = 0.1/3 = 0.0333 \quad (2)$$

As shown in FIG. 5(c), on the assumption that the tentative size tolerance "±0.2" of part K is expressed by a normal distribution (curve) and that the resultant width of the distribution is 3σ, the σ value (σ2) of part K is calculated as shown by the following equation (3). Consequently, the normal distribution of part K is expressed by "N(5, 0.0666²)".

$$\sigma = 0.2/3 = 0.0666 \quad (3)$$

In addition, the normal distribution curves shown in FIGS. 5(b) and 5(c) assume the cp index (process capability index) to be 1.

Since the sensitivities of parts J and K are "1", primary analyzing section 7 merges the normal distribution curves shown in FIGS. 5(b) and 5(c) by using below formula (4) to obtain the normal distribution shown in FIG. 5(d) in which the normal distribution is expressed by "N(15, 0.0745²)".

[Formula 1]

$$N(\mu 1 + \mu 2, \sqrt{\sigma 1^2 + \sigma 2^2}) \quad (4)$$

Figure 5D:
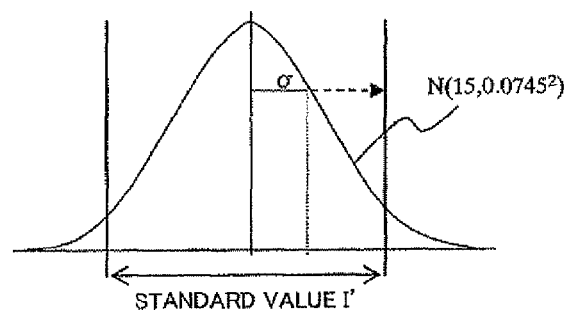
Figure 5E:
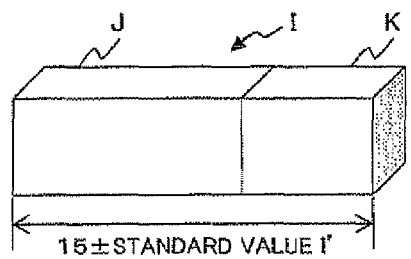

Further, with reference to a design specification value (standard value I') of a measurement object portion set by measurement object setting section 4 which portion is shown in FIG. 5(e), primary analyzing section 7 calculates how many multiplies of σ the normal distribution shown in FIG. 5(d) is and outputs the calculated σ value as the quality of structure I.

Figure 13A:
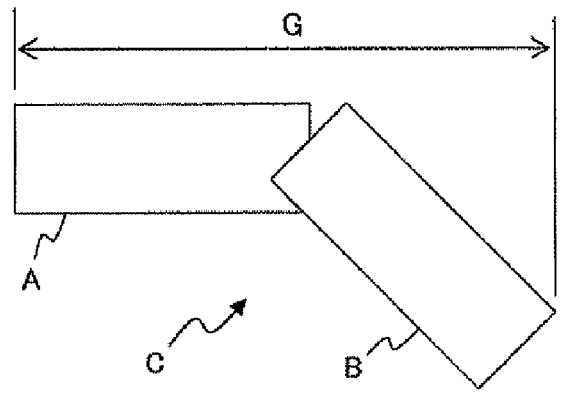
[FIG. 13] Diagrams to explain a sensitivity defined in the present invention, (a) showing a structure consisting of two parts, (b) showing a state in which the size of one of the two parts of (a) has been changed, and (c) showing a state in which the size of the remaining one has also been changed.
Figure 13B:
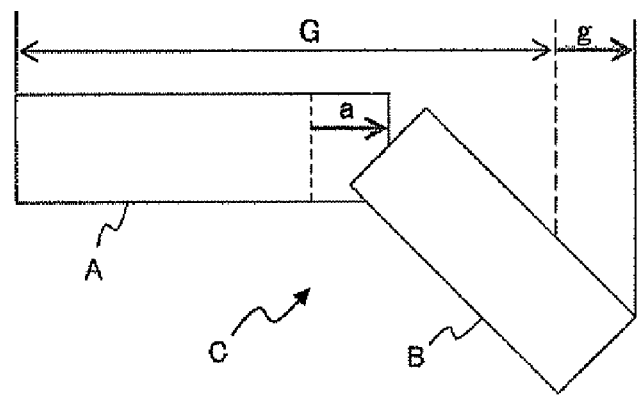
Figure 13C:
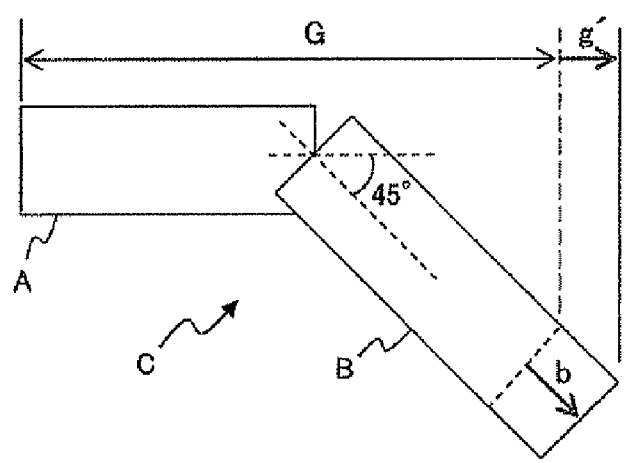
Figures 14A, 14B, 14C:
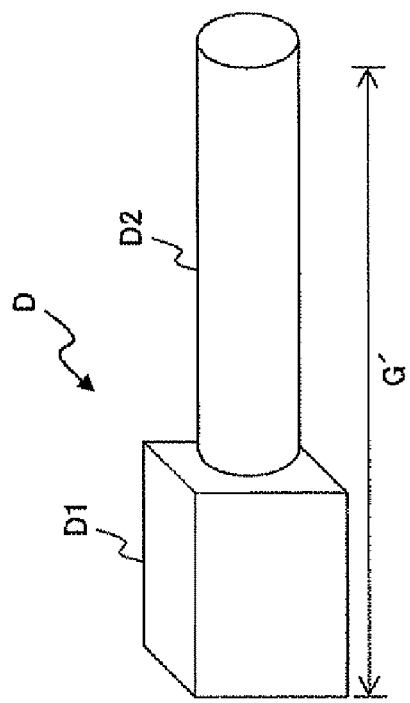
[FIG. 14] Diagrams to explain a contribution rate defined in the present invention, (a) and (b) showing parts and (c) shows a structure formed by the parts shown in (a) and (b)

Still further, primary analyzing section 7 calculates sensitivities of the parts constituting the structure as described above with reference to FIG. 13 and calculates the contribution rate of each of the parts based on the calculated sensitivities as described above with reference to FIG. 14.

Figure 6:
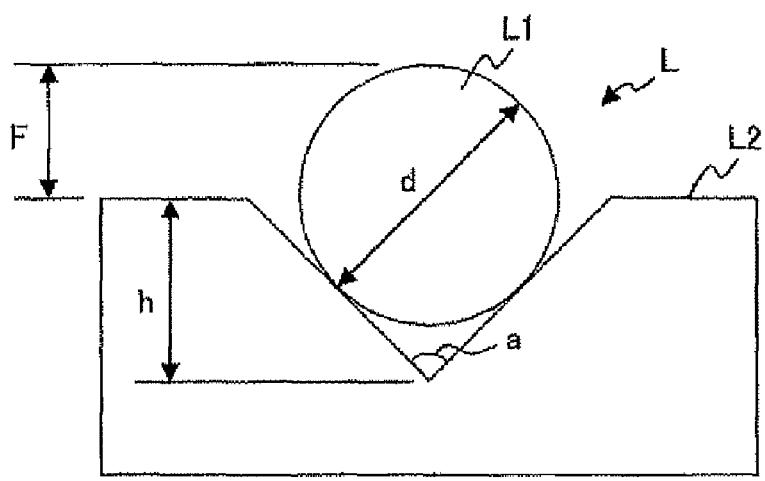
[FIG. 6] A diagram showing a method for calculating sensitivities by the primary analyzing section in the apparatus for calculating size tolerances according to this embodiment.

For structure L consisting of parts L1 and L2 shown in FIG. 6, for example, primary analyzing section 7 calculates the sensitivities of sizes d, h, a of parts L1 and L2 in the following manner using assembly function F of below formula (5).

[Formula 2]

$$F(h, d, a) = \frac{d}{2} + \frac{d}{2}\csc\left(\frac{a}{2}\right) - h \quad (5)$$

Primary analyzing section 7 differentiates assembly function F shown in above formula (5) to obtain first-order partial derivatives (sensitivities) of part sizes h, d, and a using the following formulae (6)-(8). Here, size h and angle a of part L1 are "30 mm" and "90°", respectively, and diameter d of part L2 is "30 mm".

[Formula 3]

$$\frac{\partial F}{\partial h} = 1 \quad (6)$$

[Formula 4]

$$\frac{\partial F}{\partial d} = \frac{1}{2} + \frac{1}{2}\csc\left(\frac{a}{2}\right) \approx 1.207 \quad (7)$$

[Formula 5]

$$\frac{\partial F}{\partial a} = \frac{d}{4}\csc\left(\frac{a}{2}\right)\cot\left(\frac{a}{2}\right) \approx -10.607 \quad (8)$$

Since most assembly functions F cannot be expressed in a closed form as shown by formula (5), primary analyzing section 7 generally calculates a sensitivity by using following central differential formula (9).

[Formula 6]

$$\frac{\partial F}{\partial h} \approx \frac{F(h + \Delta h) - F(h - \Delta h)}{2\Delta h} \quad (9)$$

Judging section 8 shown in FIG. 1 judges whether or not a quality calculated by primary analyzing section 7 satisfies the desired quality of a structure retained in desired quality retaining section 6.

In other words, if the a value calculated by primary analyzing section 7 is equal to or smaller than the σ value retained in desired quality retaining section 6, judging section 8 judges the structure to satisfy the desired quality; and if the σ value calculated by primary analyzing section 7 is larger than the σ value retained in desired quality retaining section 6, judging section 8 judges the structure not to satisfy the desired quality.

If the quality calculated by primary analyzing section 7 is judged to satisfy the desired quality, judging section 8 outputs the tentative size tolerances set by tentative size tolerance setting section 3 to be valid size tolerances.

On the other hand, if judging section 8 judges the calculated quality not to satisfy the desired quality, a processing is carried out by condition setting section 9, limit value setting section 12, secondary analyzing section 14, and secondary analyzing section 14.

Condition setting section 9 sets various conditions that are to be used in a tolerance analysis in secondary analyzing section 14 again, and includes restriction setting section 10 and contribution rate setting section 11.

Restriction setting section 10 sets restrictions of size tolerances of one or more of the parts, and specifically, sets restrictions on parts the size tolerances of which cannot be changed or the size tolerances of which should be restricted, depending on the shape, cost, and other factors of the parts.

Contribution rate setting section 11 sets a contribution rate (distribution rate) of each part and, for example, designates a contribution rate of each part and sets an arbitrary contribution rate of each part on the basis of the sensitivities and the contribution rates calculated by primary analyzing section 7.

Setting of a contribution rate of each part (weighting of each part) by contribution rate setting section 11 may be carried out by the designer's input via input section 15 or may be automatically performed on the basis of the sensitivities calculated by primary analyzing section 7.

Automatic setting of a contribution rate by contribution rate setting section 11 will now be described by providing a concrete example. Contribution rate setting section 11 retains a condition showing an association of a sensitivity with a contribution rate in advance, and sets a contribution rate of a part on the basis of the sensitivity calculated by primary analyzing section 7.

For example, contribution rate setting section 11 sets a contribution rate of a part on a condition that, for example, if the sensitivity is "2" or more, a contribution rate is set to be "10%" or lower and if the sensitivity is "1" or more and smaller than "2", a contribution rate is set to be higher than "10%" and lower than or equal to "20%".

Limit value setting section 12 sets the limit value of the size tolerance of each part on the basis of the design data and part information of a structure, and more specifically, sets the limit values of size tolerances of sizes of the parts on the basis of the table (see FIG. 7) showing limit values of size tolerances associated with a size of each part included in the design data and the part information.

Limit value setting section 12 does not set a limit value of a size for which restriction setting section 10 sets a restriction, so that the restriction set by restriction setting section 10 is given higher priority.

Limit value setting section 12 retains table 12a, as shown in FIG. 7 in which limit values of size tolerances are associated with the sizes, the shapes and the materials of the parts, and sets a limit value of a size tolerance of each part on the basis of table 12a.

Figure 8A:
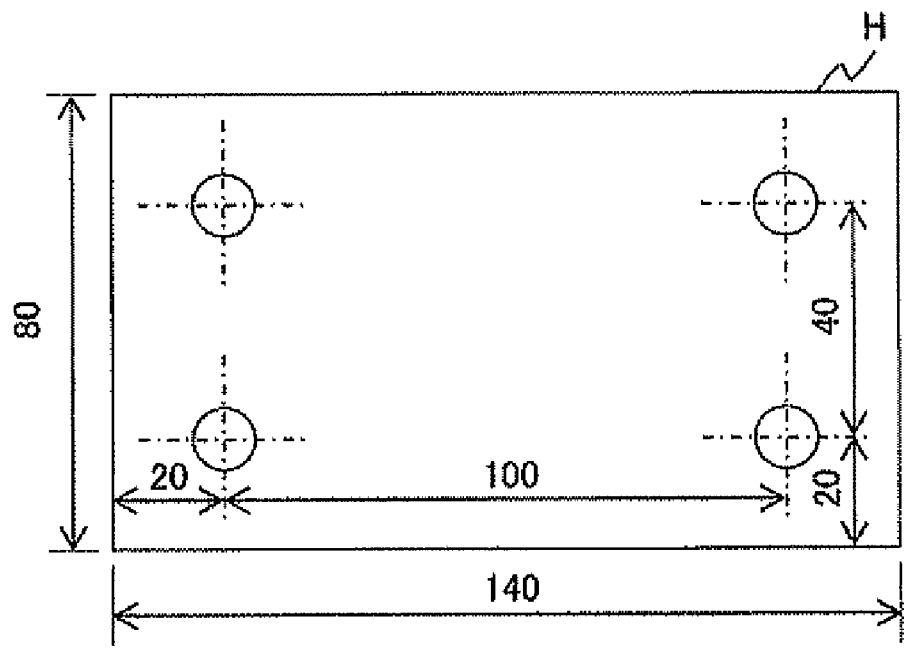
[FIG. 8] Diagrams showing setting of limit values by the limit value setting section in the apparatus for calculating size tolerances according to this embodiment, (a) showing parts whose limit values have not been set and (b) showing the parts whose limit values have been set.
Figure 8B:
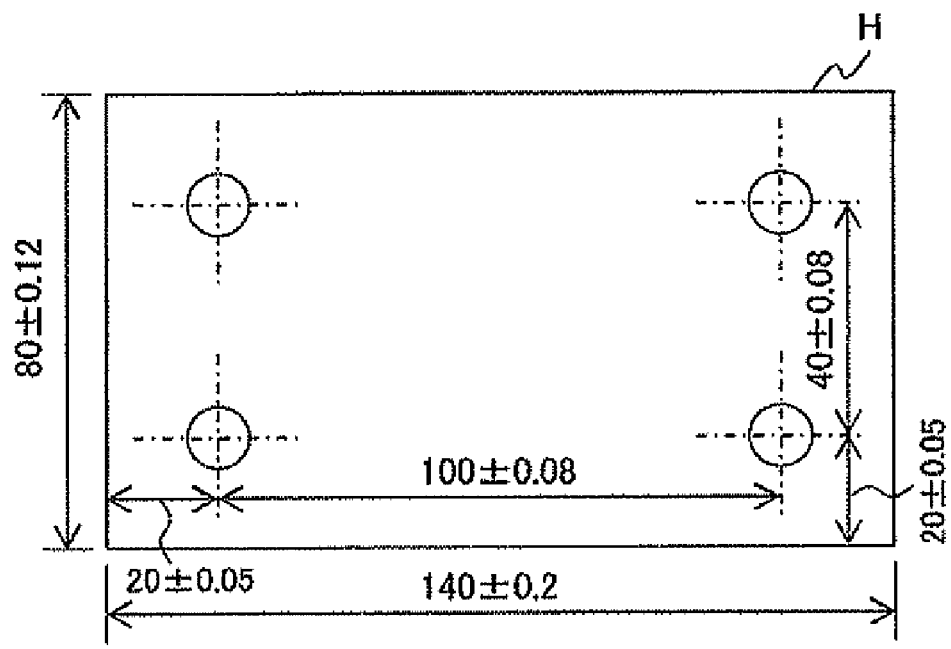

In other words, limit value setting section 12 sets a limit value of each size tolerance of part H (made of metal) shown in FIG. 8(a) on the basis of table 12a as shown in FIG. 8(b).

For example, the limit values of center distances "40" and "100" between two holes on part H are set to be "±0.08", and tentative tolerances of outer sizes (normal sizes) "80" and "140" of part H are set to be "±0.12" and "±0.2", respectively.

Secondary production method selecting section 13 selects a production method of each of the parts constituting a structure and production process data indicating a production accuracy corresponding to the production method. For example, secondary production method selecting section 13 selects production process data on the basis of table 5a shown in FIG. 4, similarly to secondary production method selecting section 13 above described.

In other words, secondary production method selecting section 13 retains tables 5a, one for each of production methods (e.g., injection molding, machining, molding, and sheet-plate working), showing size tolerances associated with size classifications and qualities Q. Production process data of is each part is selected on the basis of tables 5a and information about the shape of the part which information is included in design data.

Tables 5a retained by secondary production method selecting section 13 may show size tolerances associated also with attribution information of a part such as material information in addition to the size classifications and the qualities Q.

In selection of production process data on the basis of tables one for each production method by secondary production method selecting section 13, a number of pieces of production process data concerning a number of production methods may be selected. In such a case, secondary production method selecting section 13 finally selects a piece of production process data concerning the production method that costs the least among a number of production methods selected.

Secondary analyzing section 14 calculates size tolerances of the parts of a structure, using the sensitivities of the parts calculated by primary analyzing section 7 such that the structure satisfies the desired quality if judging section 8 judges the structure calculated by primary analyzing section 7 not to satisfy the desired quality.

Secondary analyzing section 14 calculates a size tolerance of a size (a part) for which a restriction has been set by restriction setting section 10 to satisfy the restriction and calculates a size tolerance of a part whose contribution rate has been set by contribution rate setting section 11 on the basis of the contribution rate.

In addition, for a part for which a limit value is set by limit value setting section 12, secondary analyzing section 14 calculates the size tolerances of the part to be within the limit value.

Here, description will now be made in relation to an example of calculation of a size tolerance performed by secondary analyzing section 14 with reference to FIGS. 9(a) to 9(e). The example shown in FIGS. 9(a) to 9(e) concerns calculation of a size tolerance of structure I consisting of parts J and K shown in FIGS. 5(a)-5(e) described above.

Figure 9A:
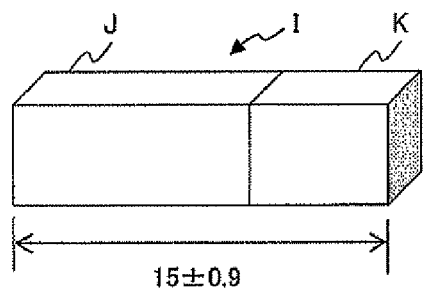
[FIG. 9] Diagrams showing size tolerance analysis performed by a secondary analyzing section included in the apparatus for calculating size tolerances according to this embodiment, (a) showing a structure to be analyzed and the standard value of the structure, (b) showing a normal distribution curve satisfying the desired quality as the standard value of (a) is applied, (c) and (d) showing normal distribution curves of size tolerances of each part to which the normal distribution curve shown in (b) has been distributed on the basis of contribution rates, and (e) showing the size tolerance of each part which tolerance is calculated.

As shown in FIG. 9(a), measurement object setting section 4 sets the standard value of the measurement object portion of structure I in this example to be "±0.9".

Figure 9B:
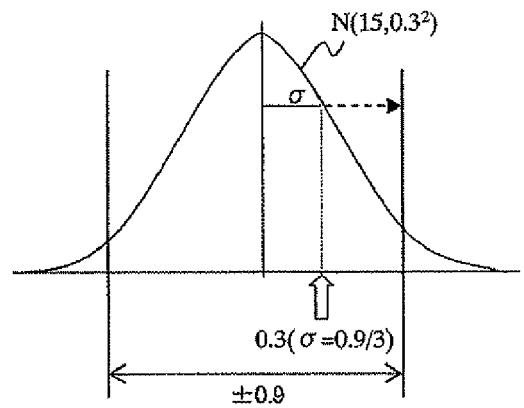

Here, provided that the quality retained by desired quality retaining section 6 is "3σ", the normal distribution of the tolerance of structure I is expressed by "N (15, 0.3²)" from following formula (10) as shown in FIG. 9(b).

$$\sigma=0.9/=0.3 \qquad (10)$$

Next, secondary analyzing section 14 divides the normal distribution shown in FIG. 9(b) on the basis of contribution rates set by contribution rate setting section 11.

Here, assuming that contribution rate setting section 11 sets contribution rates of parts J and K to be "60%" and "40%", respectively, secondary analyzing section 14 calculates σ values of parts J and K based on these contribution rates.

Namely, secondary analyzing section 14 calculates the a value in the normal distribution of part J as shown by the below equation (11) and the σ value in the normal distribution of part K as shown by the below equation (12).

[Formula 7]

$$\sigma=\sqrt{0.09\times 0.6}=0.2324 \qquad (11)$$

[Formula 8]

$$\sigma=\sqrt{0.09\times 0.4}=0.1897 \qquad (12)$$

Figure 9C:
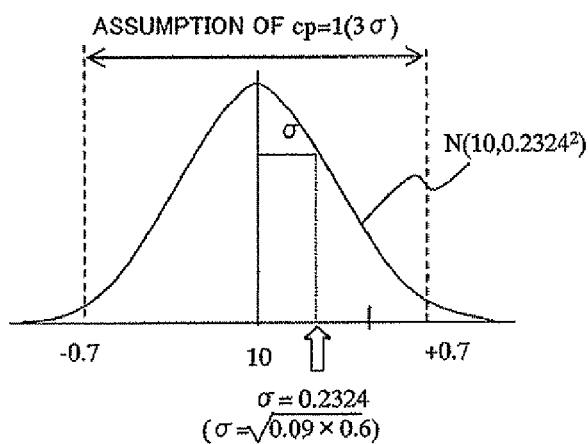
Figure 9D:
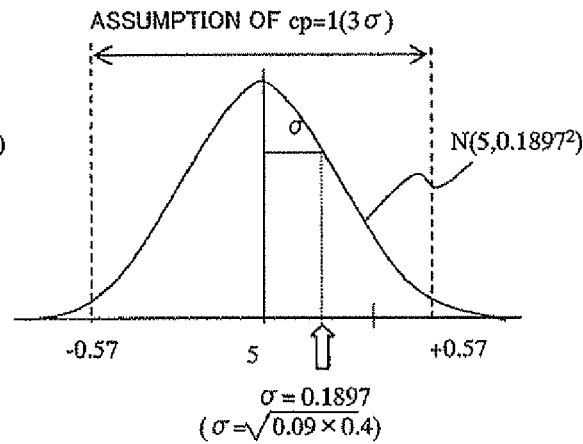

Accordingly, the normal distribution of part J is expressed by "N(10, 0.2324²)" as shown in FIG. 9(c) and that of part K is shown by "N(5, 0.1897²)" as shown in FIG. 9(d).

Figure 9E:
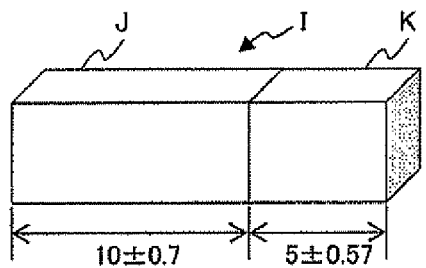

Here, since the desired quality retained in desired quality retaining section 6 is "3σ", secondary analyzing is section 14 triples the σ value of part J to calculate the size tolerance (here, "±0.7") of part J, and triples the σ value of part K to calculate the size tolerance (here, "±0.57") of part K as shown in FIG. 9(e).

As described above, secondary analyzing section 14 reverses the tolerance analysis performed by primary analyzing section 7 and thereby calculates size tolerances. In other words, a normal distribution formed by merging normal distributions constituting a structure is divided into distributions of contribution rates set by contribution rate setting section 11, and on the basis of the normal distributions of the part and the desired quality, size tolerances of the parts which maintain the desired quality are calculated.

In succession, a procedure of size tolerance calculation (by apparatus 1 for calculating size tolerance) according to this embodiment will now be described with reference to flow diagram (steps S1 to S14) in FIG. 10.

Figure 10:
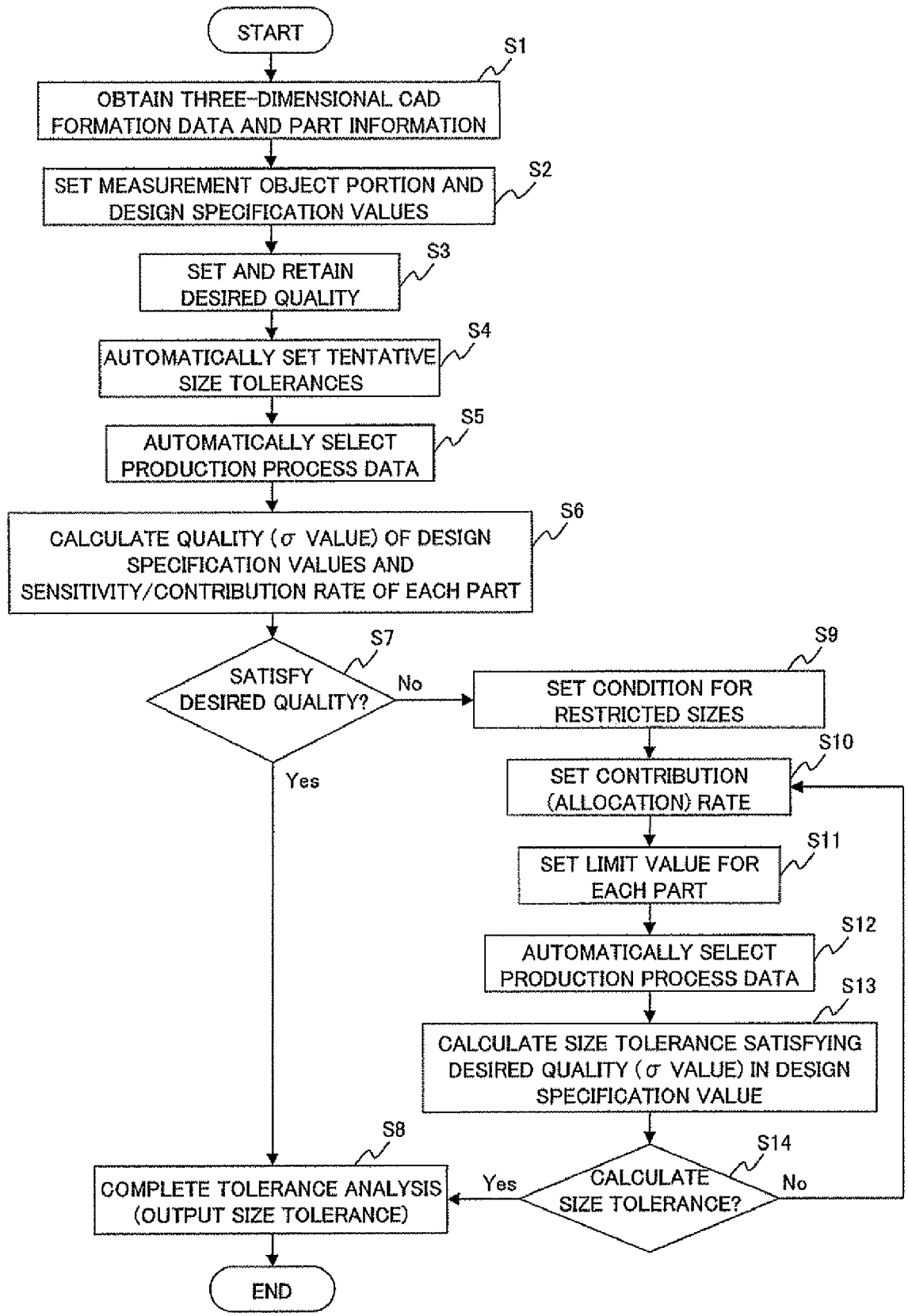
[FIG. 10] A flow diagram showing a method to calculate size tolerances according to this embodiment.

As shown in FIG. 10, in apparatus 1 for calculating size tolerance, data obtaining section 2 obtains design data (here, 3-dimensional CAD shape data) of a structure and part information of the parts constituting the structure from database 21 of design unit 20 (a step of obtaining data, step S1).

Measurement object setting section 4 sets the measurement object portion and the design specification value automatically or by input from the designer (a step of setting measurement object, step S2), and further desired quality retaining section 6 sets and retains the desired quality of the structure (a step of setting a desired quality, step S3).

Tentative size tolerance setting section 3 automatically sets tentative size tolerances of the parts on the basis of table 3a (see FIG. 2) (a step of setting tentative size tolerances, step S4), and primary production method selecting section 5 automatically selects production process data of each of the parts on the basis of table 5a (see FIG. 4) (a step of primary selecting a production method, step S5).

The order of performing above steps S2-S5 should by no means be limited in the present invention, and it is sufficient that the procedure of steps S2-S5 is completed before step S6 described below takes place.

In succession, primary analyzing section 7 calculates a quality (σ value) corresponding to the design specification value set by measurement object setting section 4 in step S3 and also calculates the sensitivity and the contribution rate of each part (the step of primary analyzing, step S6).

Figures 11A, 11B, 11C:
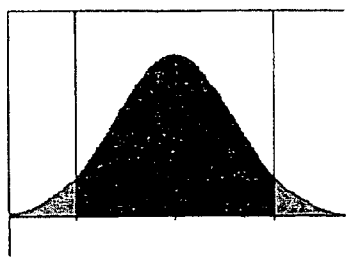
[FIG. 11] Diagrams showing a result of calculation performed s by the primary analyzing section in the apparatus for calculating size tolerance of this embodiment, (a) showing a values, (b) showing sensitivities, and (c) showing contribution rates.

The result of calculation by primary analyzing section 7 is preferably displayed on a monitor (not shown) connected to apparatus 1 for calculating size tolerance as shown in, for example, FIGS. 11(a)-11(c).

Here, FIG. 11(a) shows a normal distribution of the quality (σ value) calculated by primary analyzing section 7; FIG. 11(b) shows a sensitivity of each of the parts (here, four parts) which sensitivity is calculated by primary analyzing section 7; and FIG. 11(c) shows a contribution rate of the part.

Judging section 8 then compares the desired quality retained in desired quality retaining section 6 with the quality calculated by primary analyzing section 7 in step S6 to judge whether or not the calculated quality satisfies the desired quality (a step of judging, step S7).

Here, if judging section 8 judges the quality calculated by primary analyzing section 7 to satisfy the desired quality (Yes route in step S7), judging section 8 outputs the tentative size tolerances set by tentative size tolerance setting section 3 in step 54 as valid size tolerances and completes the procedure (step S8). Concurrently, the production method selected by primary production method selecting section 5 in step S5 is output as a production method for each part.

Conversely, if judging section 8 judges the quality calculated by primary analyzing section 7 not to satisfy the desired quality (No route in step S7), the processes of steps S9-S14 that is to be described below will be carried out.

In detail, restriction setting section 10 sets a restriction (condition) on a size of the structure for which size should be restricted (a step of setting restriction, step S9), and further, contribution rate setting section 11 sets a contribution rate (distribution rate) of each of the parts constituting the structure (a step of setting a contribution rate, step S10).

After that, limit value setting section 12 sets limit values of size tolerances of sizes on which restriction setting section 10 has set restrictions in step S9 on the basis of table 12a (see FIG. 7) (a step of setting a limit value, step S11).

Secondary production method selecting section 13 selects production process data for each of the parts on the basis of table 5a (see FIG. 4) (a step of secondary selecting a production method, step S12).

Secondary analyzing section 14 calculates size tolerances which satisfy the desired quality (σ value) set and retained by desired quality retaining section 6 in step S3 by reversing the procedure of the tolerance analysis of step S6 performed by primary analyzing section 7, considering various conditions (restrictions) set during steps S9-S11 (a step of secondary analyzing, step S13).

Figures 12A, 12B, 12C:
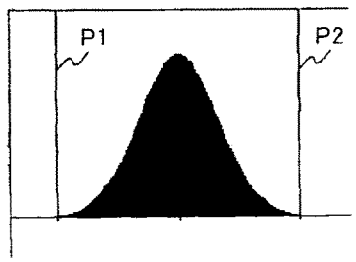
[FIG. 12] Diagrams showing a result of calculation performed by the secondary analyzing section in the apparatus for calculating size tolerance of this embodiment, (a) showing σ values, (b) showing sensitivities, and (c) showing contribution rates.

The result of the calculation in step S13 performed by secondary analyzing section 14 is preferably displayed on the monitor as shown in FIGS. 12(a)-12(c). Here, the example FIGS. 12(a)-12(c) are the result of calculation in a case where contribution rate setting section 11 has set a contribution rate for each of the parts to be the same in step S10.

As a consequence, the normal distribution shown in FIG. 12(a) falls within the range between the lines P1 and P2 which show the desired quality and therefore satisfies the desired quality.

As shown in FIG. 12(b), the sensitivities of the parts are the same as those shown in FIG. 11(b).

Further, the parts (here, four parts) have an equal contribution rate of "25%" which has been set in step S10, as shown in FIG. 12(c).

If secondary analyzing section 14 cannot calculate the size of each part constituting the structure due to the various restrictions set in steps S9-S11 (that is, secondary analyzing section 14 does not calculate the size tolerances of the parts which satisfy the desired quality and also meet the various conditions; No route in step S14), the procedure returns to step S10 to make contribution rate setting section 11 renew (change) the contribution rates.

On the other hand, if secondary analyzing section 14 calculates the size tolerances of the sizes (Yes route in step S14), secondary analyzing section 14 outputs the calculated size tolerances and also outputs the production methods selected by secondary production method selecting section 13 in step S12 as the production methods one for each of the parts to complete the tolerance analysis (step S8) Finally the procedure is completed.

As described above, since tentative size tolerance setting section 3 sets tentative size tolerances for each size of each part in apparatus 1 and the method for calculating size tolerance according to this embodiment, it is possible to save the designer's input operation and to eliminate input errors.

In addition, secondary analyzing section 14 calculates the size tolerances of the parts such that the structure satisfies the desired quality, using the sensitivities calculated by primary analyzing section 7. In other words, the size tolerances that satisfy the desired quality are calculated by reversing the tolerance analysis performed by primary analyzing section 7, so that the calculation can definitely obtain the size tolerances that satisfy the desired quality.

Further, the presence of secondary analyzing section 14 makes it possible to calculate optimum size tolerances that are neither excessively poor nor tight.

Figure 15:
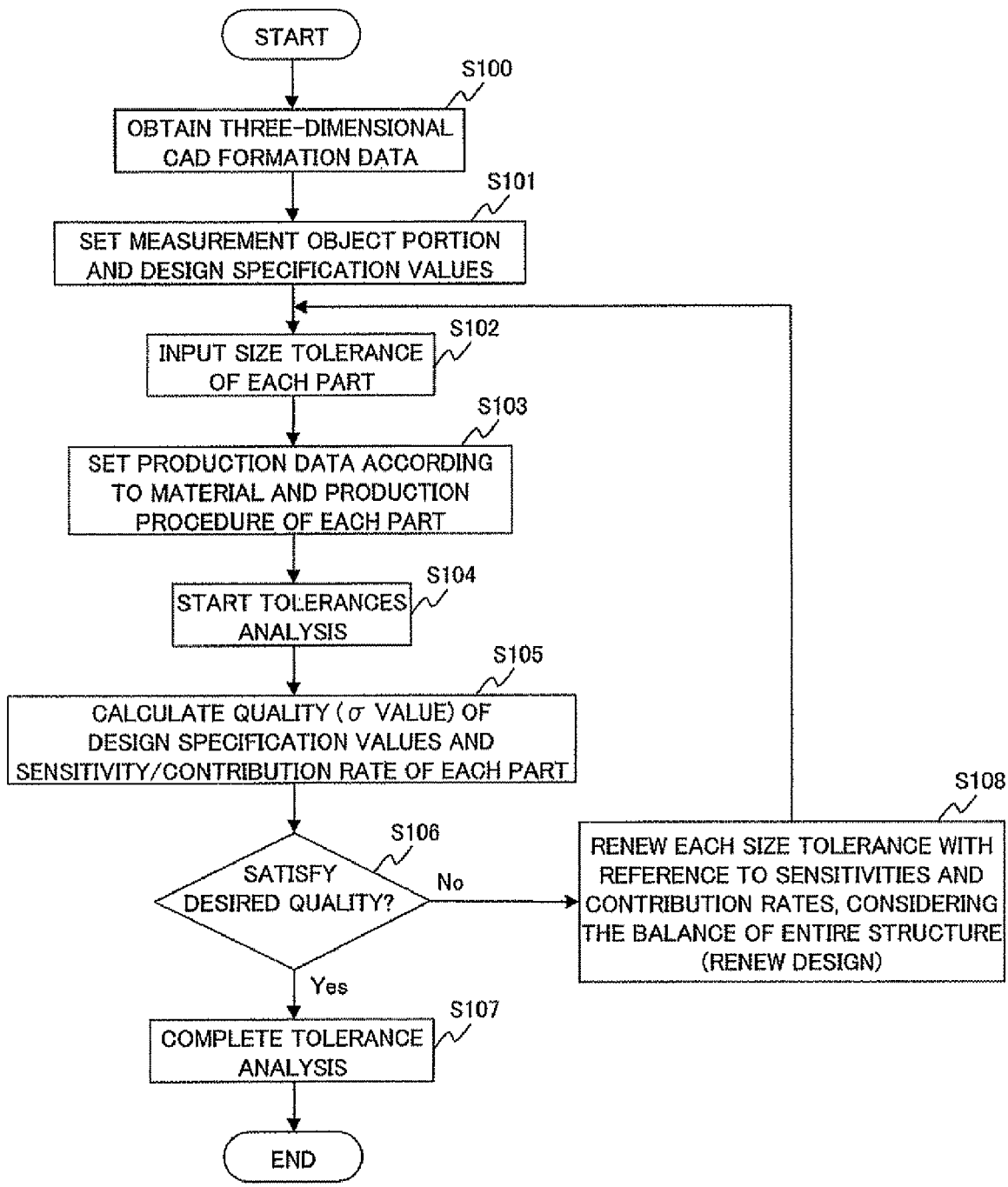
[FIG. 15] A flow diagram showing a procedure of tolerance analysis in a conventional tolerance analysis system.

Still further, since secondary analyzing section 14 obtains size tolerances that satisfy the desired quality through calculation reversing the tolerance analysis performed by primary analyzing section 7, it is possible to figure out the size tolerances by undergoing an extremely small number of processes in a greatly reduced time with high efficiency differently from the conventional tolerance analysis system described with reference to FIG. 15 in which size tolerances are calculated through a number of times of varying the tolerances depending on experience and guesswork of the designer.

If judging section 8 judges the result of the analysis by primary analyzing section 7 to satisfy the desired quality, the tentative size tolerances set by tentative size tolerance setting section 3 are output, being regarded as valid size tolerances. That makes calculation of size tolerances more highly efficient.

Further, data obtaining section 2 obtains part information in addition to design data retained in database 21 of design unit 20, the designer does not have to set the attribution information, such as materials of the parts, by manual input, which reduces the designer's input labor and eliminates the occurrence of input error.

Contribution rate setting section 11 sets a contribution rate (the distribution rate of the normal distribution) indicating dispersion of size of each part, and secondary analyzing section 14 calculates size tolerances of the parts, considering the contribution rates set by contribution rate setting section 11. A structure can be designed by considering accuracy required for production and costs for production.

Since restriction setting section 10 sets a restriction of a size which should be restricted and secondary analyzing section 14 calculates the size tolerances to satisfy the restriction set by restriction setting section 10, the size tolerances can be calculated under consideration of restrictions on production accuracy and production cost caused from the shapes of the parts and other factors.

Since limit value setting section 12 sets a limit value of a size tolerance of each part and secondary analyzing section 14 calculates the size tolerance of the part within the range defined by the limit value set by limit value setting section 12, it is possible to obtain size tolerances relatively high in quality among those satisfying the desired quality and to thereby suppress the dispersion of a size tolerance of each part.

Primary production method selecting section 5 and secondary production method selecting section 13 select production process data for each part, which data should cease to be set through input by the designer. This reduces the operator's input labor and eliminates occurrence of input errors.

Further, primary production method selecting section 5 and secondary production method selecting section 13 select the production process data that cost the least for each part to contribute to reduction in production cost of the structure of the design object.

(2) Others:

The present invention should by no means be limited to the foregoing embodiment, and various modifications can be suggested without departing from the sprit of the present invention.

For example, tables 3a, 5a, and 12a should not be limited to the forms described in conjunction with this embodiment, and are satisfactory if based on information at least about the shapes and the attributes of the parts.

In the above first embodiment, description is made assuming that the design object structure is formed by two parts, but structures of the objects of the present invention are not limited to the example.

The functions as data obtaining section 2, tentative size tolerance setting section 3, measurement object setting section 4, primary production method selecting section 5, desired quality retaining section 6, primary analyzing section 7, judging section 8, restriction setting section 10, contribution rate setting section 11, limit value setting section 12, secondary production method selecting section 13, secondary analyzing section 14, and inputting section 15 may be realized by a computer (including a CPU, an information processor, various terminals) executing a predetermined application program (a size tolerance calculation program).

The program is provided in the form of being recorded in a computer-readable recording medium, such as a flexible disk, a CD (e.g., CD-ROM, CD-R, CD-RW), or a DVD (e.g., DVD-ROM, DVD-RAM, DVD-R, DVD-RW, DVD+R, DVE+RW). Further, the computer may read the size tolerance calculation program from such a recording medium and send the read program to an internal or external memory to store for use.

Further alternatively, the program may be recorded in a memory device (a recording medium), such as a magnetic disk, an optical disk or a magneto-optical disk, and is provided to a computer from the memory device through a communication path.

Here, a computer is a concept of a combination of hardware and an OS and means hardware which operates under control of the OS. Otherwise, if an application program operates hardware independently of an OS (Operating System), the hardware corresponds to the computer. Hardware includes at least a microprocessor such as a CPU and means to read a computer program recorded in a recording medium.

The application program serving as the above size tolerance calculation program includes program codes to prompt the computer described above to realize the functions of data obtaining section 2, tentative size tolerance setting section 3, measurement object setting section 4, primary production method selecting section 5, desired quality retaining section 6, primary analyzing section 7, judging section 8, restriction setting section 10, contribution rate setting section 11, limit value setting section 12, secondary production method selecting section 13, secondary analyzing section 14, and inputting section 15. The functions may be partially performed by OS but not by the application program.

The recording medium used in this embodiment may be various computer-readable recording media such as an IC card, a ROM cartridge, a magnetic tape, a punch card, an internal storage unit (RAM or ROM) for a computer, an external storage unit, or a printing matter on which codes, such as bar codes, are printed, in addition to a flexible disk, a CD, a DVD, a magnetic disk, an optical disk and a magnet-optical disk listed above.

What is claimed is:

1. An apparatus calculating size tolerances of a plurality of parts constituting a structure comprising:
    a tentative size tolerance setting section setting tentative size tolerances of the plurality of parts based on design data of the structure and part information of the plurality of parts;
    a primary analyzing section calculating a quality of the structure and sensitivities of the plurality of parts based on the tentative size tolerances set by said tentative size tolerance setting section;
    a judging section judging whether or not the quality calculated by said primary analyzing section satisfies a desired quality which the structure demands;
    a secondary analyzing section calculating, if said judging section judges that the quality calculated by said primary analyzing section does not satisfy the desired quality, the size tolerances of the plurality of parts using the sensitivities calculated by said primary analyzing section such that the structure satisfies the desired quality; and
    a restriction setting section for setting restrictions on the size tolerances of one or more of the plurality of parts, wherein
    said secondary analyzing section sets the size tolerances of the one or more parts for which said restriction setting section sets the restrictions on the size tolerances such that the restrictions are satisfied.

2. An apparatus according to claim 1, wherein, if said judging section judges that the quality calculated by primary analyzing section satisfies the desired quality, said primary analyzing section outputs the tentative size tolerances set by said size tolerance setting section as the size tolerances.

3. An apparatus according to claim 1, further comprising an obtaining section obtaining the design data of the structure and the part information.

4. An apparatus according to claim 1, wherein said tentative size tolerance setting section sets the tentative size tolerances based on a table showing tentative size tolerances associated with sizes of the plurality of parts which sizes are included in the design data and the part information.

5. An apparatus according to claim 1, further comprising a contribution rate setting section setting contribution rates of the plurality of parts, wherein said secondary analyzing section calculates the size tolerances based on the contribution rates calculated by said contribution rate setting section.

6. An apparatus according to claim 1, further comprising a production method selecting section selecting a production method in which each of the plurality of parts is to be produced to make the structure satisfy the desired quality.

7. An apparatus according to claim 6, wherein if there are two or more of the production methods for each said part making the structure satisfy the desired quality is to be produced, said production method selecting section selects one that costs the least among the two or more production methods.

8. An apparatus calculating size tolerances of a plurality of parts constituting a structure comprising:
- a tentative size tolerance setting section setting tentative size tolerances of the plurality of parts based on design data of the structure and part information of the plurality of parts;
- a primary analyzing section calculating a quality of the structure and sensitivities of the plurality of parts based on the tentative size tolerances set by said tentative size tolerance setting section;
- a judging section judging whether or not the quality calculated by said primary analyzing section satisfies a desired quality which the structure demands;
- a secondary analyzing section calculating, if said judging section judges that the quality calculated by said primary analyzing section does not satisfy the desired quality, the size tolerances of the plurality of parts using the sensitivities calculated by said primary analyzing section such that the structure satisfies the desired quality; and
- a limit value setting section for setting limit values on the size tolerances of one or more of the plurality of parts, wherein
said secondary analyzing section calculates the size tolerances of the one or more parts within the limit values set by said limit value setting section.

9. An apparatus according to claim 8, wherein said limit value setting section sets the limit values based on a table showing limit values associated with sizes of the plurality of parts which sizes are included in the design data and the part information.

10. A computer-readable recording medium in which a program for calculating size tolerances of a plurality of parts constituting a structure is recorded, wherein said program instructs a computer to function as:
- a tentative size tolerance setting section setting tentative size tolerances of the plurality of parts based on design data of the structure and part information of the plurality of parts;
- a primary analyzing section calculating a quality of the structure and sensitivities of the plurality of parts based on the tentative size tolerances set by said tentative size tolerance setting section;
- a judging section judging whether or not the quality calculated by said primary analyzing section satisfies a desired quality which the structure demands;
- a secondary analyzing section for calculating, if said judging section judges that the quality calculated by said primary analyzing section does not satisfy the desired quality, the size tolerances of the plurality of parts using the sensitivities calculated by said primary analyzing section such that the structure satisfies the desired quality; and
- a restriction setting section setting restrictions on the size tolerances of one or more of the plurality of parts, wherein said secondary analyzing section sets the size tolerances of the one or more parts for which said restriction setting section sets the restrictions on the size tolerances such that the restrictions are satisfied.

11. A computer-readable recording medium according to claim 10, wherein if said judging section judges that the quality calculated by primary analyzing section satisfies the desired quality, said primary analyzing section outputs the tentative size tolerances set by said size tolerance setting section as the size tolerances.

12. A computer-readable recording medium according to claim 10, wherein said program instructs the computer to further function as an obtaining section obtaining the design data of the structure and the part information.

13. A computer-readable recording medium according to claim 10, wherein said tentative seize tolerance setting section sets the tentative size tolerances based on a table showing tentative size tolerances associated with sizes of the plurality of parts which sizes are included in the design data and the part information.

14. A computer-readable recording medium according to claim 10, wherein:
said program instructs the computer to further function as a contribution rate setting section setting contribution rates of the plurality of parts; and
said secondary analyzing section calculates the size tolerances based on the contribution rates calculated by said contribution rate setting section.

15. A computer-readable recording medium according to claim 10, wherein said program instructs the computer to further function as a production method selecting section selecting a production method in which each of the plurality of parts is to be produced to make the structure satisfy the desired quality.

16. A computer-readable recording medium in which a program for calculating size tolerances of a plurality of parts constituting a structure is recorded, wherein said program instructs a computer to function as:
- a tentative size tolerance setting section setting tentative size tolerances of the plurality of parts based on design data of the structure and part information of the plurality of parts;
- a primary analyzing section calculating a quality of the structure and sensitivities of the plurality of parts based on the tentative size tolerances set by said tentative size tolerance setting section;
- a judging section judging whether or not the quality calculated by said primary analyzing section satisfies a desired quality which the structure demands;
- a secondary analyzing section for calculating, if said judging section judges that the quality calculated by said primary analyzing section does not satisfy the desired quality, the size tolerances of the plurality of parts using the sensitivities calculated by said primary analyzing section such that the structure satisfies the desired quality; and
- a limit value setting section setting limit values on the size tolerances of one or more of the plurality of parts, wherein
said secondary analyzing section calculates the size tolerances of the one or more parts within the limit values set by said limit value setting section.

17. A computer-readable recording medium according to claim 16, wherein said limit value setting section sets the limit values based on a table showing limit values associated with sizes of the plurality of parts which sizes are included in the design data and the part information.

* * * * *

UNITED STATES PATENT AND TRADEMARK OFFICE
CERTIFICATE OF CORRECTION

PATENT NO. : 7,660,697 B2
APPLICATION NO. : 12/024194
DATED : February 9, 2010
INVENTOR(S) : Kazuhiko Hamazoe Page 1 of 1

It is certified that error appears in the above-identified patent and that said Letters Patent is hereby corrected as shown below:

In the Claims:

Column 18, Line 16, change "seize" to --size--.

Signed and Sealed this
Fourteenth Day of May, 2013

Teresa Stanek Rea
*Acting Director of the United States Patent and Trademark Office*